Oct. 3, 1933.                C. H. COLVIN                1,929,091
                      RATE OF CLIMB INSTRUMENTS
                     Filed July 31, 1929        2 Sheets-Sheet 1

INVENTOR.
CHARLES H. COLVIN
BY Stephen Gerstvik
ATTORNEY

Oct. 3, 1933.　　　C. H. COLVIN　　　1,929,091
RATE OF CLIMB INSTRUMENTS
Filed July 31, 1929　　2 Sheets-Sheet 2
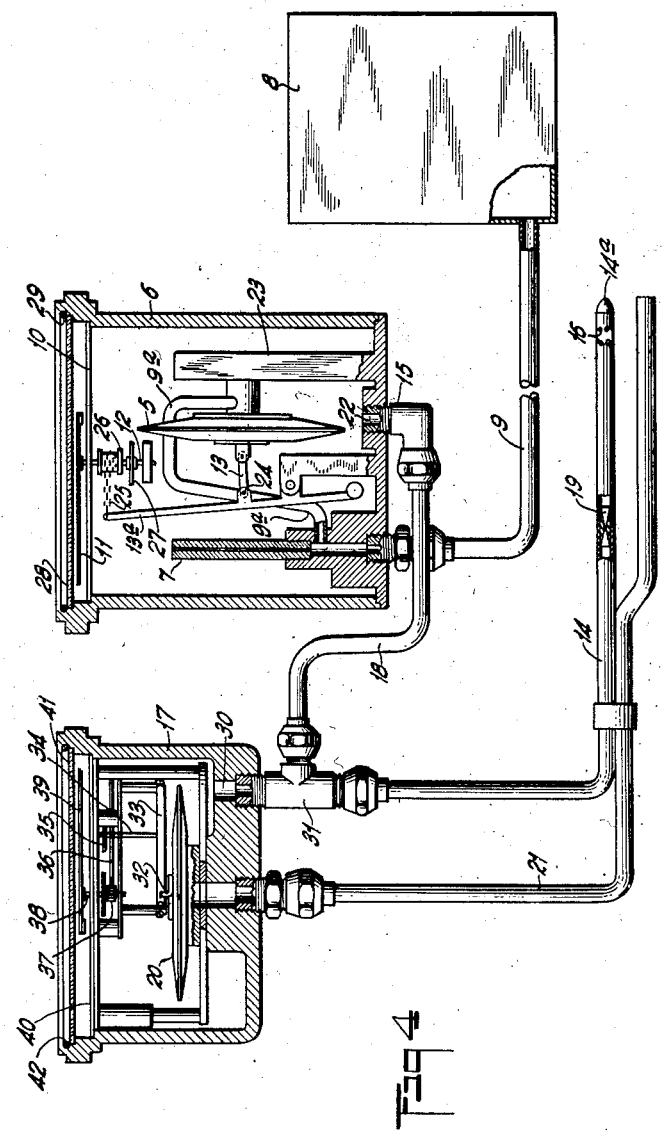
INVENTOR.
CHARLES H. COLVIN.
BY Stephen Cerstvik.
ATTORNEY Patented Oct. 3, 1933

1,929,091

UNITED STATES PATENT OFFICE 1,929,091

RATE OF CLIMB INSTRUMENTS

Charles H. Colvin, Brooklyn, N. Y., assignor to Pioneer Instrument Company, Incorporated, Brooklyn, N. Y., a corporation of New York Application July 31, 1929. Serial No. 382,315

17 Claims. (Cl. 264—1)

This invention relates to instruments responsive to rate of change in atmospheric pressure and to means supplementary to such instruments whereby their usefulness when used for measuring the rate of climb (or descent) of aircraft is increased. More particularly, this invention concerns a rate of climb instrument which is capable of giving immediate indication of the initiation of a change in altitude of an aircraft carrying the instrument.

A rate of climb instrument operates in response to the rate of change of pressure occurring as the instrument is carried either in ascension or in descension and the dial of the instrument is graduated to indicate rate of change in elevation. In such instrument it is a common practice to connect the inside of a pressure sensitive element such as an expansible diaphragm to the atmosphere through a capillary or through some other form of restricted passage. The expansible diaphragm is enclosed within a casing which has communication with the atmosphere in order that the temporary differential effect of the pressure of the atmosphere surrounding the expansible diaphragm and that within the expansible diaphragm may be operative to cause movements of a pointer in accordance with the rate of change of atmospheric pressure.

Instruments of this character have been found very satisfactory and meet the stringent requirements of aviation. However, while these instruments give an indication when there is an actual change in elevation taking place they do not instantaneously give an appreciable visible indication at the instant the change is initiated. Pilots depend a great deal upon their instruments and it is of importance that a pilot know at the instant any change in elevation is initiated.

Since distance in elevation must be travelled before a change of pressure takes place and this factor necessarily involves the element of time, a climb may be actually started at a high rate, for example at the rate of 1,000 feet per minute and the instrument would not indicate such a rate until the corresponding vertical distance had been travelled. Therefore, under such a condition, a ship might actually have initiated a rate of climb greater than that being indicated by the instrument.

Then again, because of the lag of indication of such an instrument the limits of altitude within which a pilot could giude his craft for level flight would be of considerable spacing.

Furthermore, cockpit pressures are effective upon instruments and these pressures frequently exceed the maximum working pressure for which an instrument is designed with the result that an indication is obtainable which is related to some other maneuver than that which is intended to be indicated. For example, in climbing the pressure in a cockpit of a certain design may increase and cause the rate of climb instrument to indicate descent instead of ascent. Such misinformation to the pilot may have serious consequences as is apparent.

It is among the objects of the invention to provide a rate of climb instrument obviating the disadvantages hereinabove outlined so as to increase the utility of such an instrument and thereby provide a pilot with information conducive to more efficient and safe flight.

Another object of the invention is to provide means improving the sensitivity of a rate of climb instrument at the instant a change of level is initiated.

Another object of the invention is to improve the operating characteristics of a rate of climb instrument by minimizing or eliminating any lag of indication which is characteristic of the type of rate of climb instruments with which the invention is associated with the result that a pilot may be placed on notice in ample time to avoid exceeding the angle of climb at which his craft will stall.

Still another object of the invention is to provide a rate of climb instrument disassociated from the influence of any cockpit pressure whereby its reliability may be depended upon during different maneuvers and the instrument is capable of standardization for use on various aircrafts of different designs.

A still further object is to associate a rate of climb instrument with an air speed indicator in a novel manner whereby the former is made more sensitive to indicate instantaneous changes in the rate of climb of an aircraft without impairing the function of the air speed indicator.

With these and incidental objects in view the invention consists of certain novel features of construction and combination of parts, the essential elements of which are set forth in the appended claims and a preferred form of embodiment of which is described hereinafter with reference to the drawings which accompany and form part of the specification. It is to be expressly understood, however, that the drawings are only for the purpose of illustration and description, and are not designed as a definition of the limits of the invention, reference being had for this purpose to the appended claims.

In the drawings, wherein like reference characters refer to like parts throughout the several views, Fig. 1 is a more or less diagrammatic view, partly in section, of a rate of climb instrument embodying one of the principles of the invention, whereby cockpit pressures on the instrument are eliminated;

Fig. 4 is an assembly view, partly in section, of one form of a practical embodiment of the invention.

Figure 1:
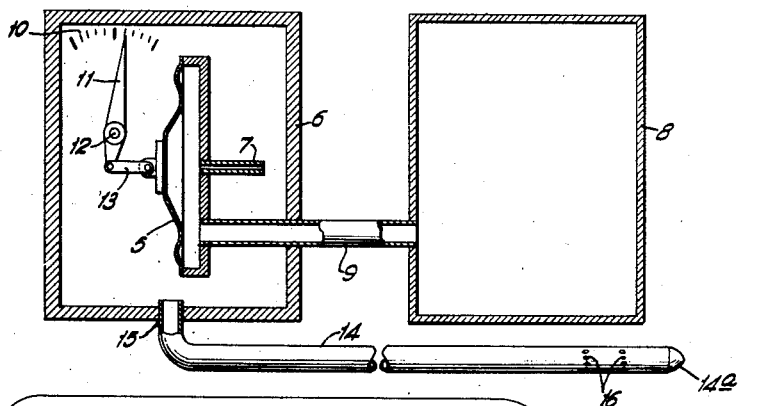

As has been pointed out hereinbefore, a rate of climb instrument comprises a pressure sensitive element, such as an expansible diaphragm, having the interior thereof connected to the atmosphere through a restricted passage, such as a capillary tube or restricted orifice, and the diaphragm in turn is enclosed within a casing which is also in connection with the atmosphere in order that the temporary differential effect of the pressure surrounding the expansible diaphragm and that within the diaphragm may be operative to cause movements of a pointer in accordance with the rate of change of altitude. Such an instrument is illustrated diagrammatically in Fig. 1, wherein the expansible diaphragm is shown at 5, having its interior in communication with the interior of a casing 6, within which it is located, through a capillary tube 7. The interior of the pressure sensitive element 5 is also in communication with a heat-insulated tank 8 by means of a conduit or pipe 9 so as to provide a large effective volume coordinated with the relatively small volume of the interior of the pressure sensitive element. The movements of the diaphragm 5 produced by a rate of change of altitude are indicated on a scale 10 by means of a pointer 11, which is pivoted at 12 and connected to the diaphragm 5 through suitable transmission means, as for example the link 13.

Ordinarily, the casing 6 is provided with an opening for establishing the interior thereof in communication with the atmosphere, but since the instrument is located in the cockpit of the plane, the pressure therein is not true atmospheric pressure, because the cockpit is subject to pressures other than true atmospheric pressure, at various speeds of the aircraft. Means are therefore provided whereby the interior of casing 6 may be subjected to atmospheric pressure only, and in the form shown said means comprise a pipe or conduit 14 connected to the interior of the casing 6 at 15 and terminating in a position remote from the instrument and protected from eddy currents and changes of pressure not consisting of changes in atmospheric pressure only. Such a position as this may be found spaced from a wing or strut of an airplane. The end 14a of the conduit or pipe 14 is closed and faces the direction of flight, and is provided with one or more series of circumferential holes 16 to permit only static atmospheric pressure to be operative within the pipe 14. The latter may constitute the static portion of a Pitot tube. In this manner, the interior of the casing 6 and therefore the pressure sensitive element or diaphragm 5 is subjected only to true atmospheric pressure, thereby giving true indications of rate of climb by means of the scale 10 and pointer 11.

A satisfactory commercial form of rate of climb instrument may be so manufactured as to provide for indications of rate of climb for changes in altitude at the rate of 1,000 feet per minute corresponding to a pressure of about one inch of water. This proportion may be varied, but the figures are set forth so as to afford an understanding of the operating characteristics of the type of rate of climb indicator referred to hereinabove. Such instruments have proven to be entirely satisfactory for giving indications of rate of climb, but it is perceivable that an appreciable difference in altitude must take place before the change of reading of such an instrument indicates that a change of altitude is taking place.

Since a considerable range of rate is desired to be indicated, it is apparent that due to the short distance the pointer travels to indicate commensurately with a substantial change in altitude, and also due to the inherent time factor involved for the change in elevation to take place, there is an apparent lag in the movement of the pointer from its zero position, which fact does not make it possible for a pilot to learn from the instrument when a change from level flight is initiated. It frequently is important for a pilot to know the instant his ship changes from level flight, but with the instruments heretofore commonly used, a pilot might not notice that he has changed his level of flight until he has climbed or has descended an appreciable amount from his original level.

Novel means are therefore provided whereby the lag of the pointer from zero position is eliminated and the initial movement of the pointer even exaggerated to a certain extent. To this end, in accordance with the principles of the present invention, the interior of the casing of the rate of climb instrument is connected with the interior of a partly closed chamber whose volume is susceptible to immediate temporary expansion upon a decrease in flying speed of the craft on which the instrument is carried and to immediate diminution upon an increase in flying speed. In this manner the differential pressure effects discussed hereinbefore in the description of the rate of climb instrument are added to, with the result that the sensitivity of the instrument is increased.

Figure 2:
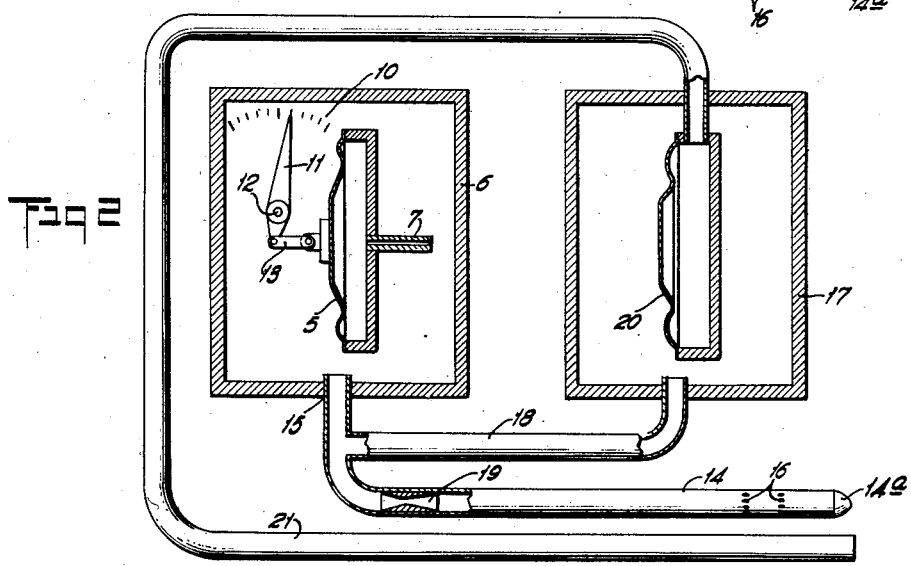
Fig. 2 is also a more or less diagrammatic view illustrating another of the principles of the invention, whereby a rate of climb instrument is rendered more sensitive and operative instantaneously upon a change of altitude.

A simple form of device embodying this feature of the invention is illustrated diagrammatically in Fig. 2, wherein the casing 6 of the rate of climb instrument is connected to the atmosphere through the pipe or conduit 14 as in Fig. 1, but which is also connected to a closed chamber or casing 17 by means of a connecting pipe 18. The chamber or casing 17 is closed from the atmosphere except for a restricted passage 19, which may be in the form of a venturi, to ensure equalization of pressures within the casing 6 of the rate of climb instrument and the casing 17.

Means are now provided for subjecting the air volume of the casing 17 to changes in accordance with changes in flying speed, and in the form shown said means comprise a pressure sensitive element or expansible diaphragm 20 the interior of which is connected with a tube 21 opening in the direction of flight and susceptible to velocity pressures. The tube 21 may be the velocity portion of a Pitot tube of the type such as are generally used on aircraft. Accordingly, as the flying speed decreases, the volume of the pressure sensitive element 20 decreases, and the volume of the casing 17 increases, with the result that a temporary rarefication of air occurs in casings 6 and 17. This temporary rarefication and decrease in pressure augments the motion of the yielding wall of the expansible diaphragm member 5 of the rate of climb instrument, and as the flying speed decreases when a craft starts to climb under ordinary cruising speeds, the indicating hand or pointer 11 is actuated appreciably at the initiation of a change in level or flight. An increase in the speed of flight affects the indication of the rate of climb instrument in a reverse direction because of converse reactions.

The rate of climb instrument, as has been previously stated, is essentially a pressure level indicating instrument and not a pitch indicator, and the pressure within the expansible diaphragm member 20 transmitted thereto by means of the velocity tube 21 is a function of the speed of the aircraft. The lift of the aircraft for a given angle of incidence of the airfoil section, however, is also a function of speed, as indicated by the following formula:

$$L = K_y \times A \times V^2$$

Where L = the lift,
K = the lift constant,
A = the area of the effective surface of the airfoil, and
V = the velocity of the air.

Therefore, with $K_y$ and A remaining constant, if V, or airspeed, increases, the lift will also increase, and the craft will begin to climb, since the weight of the ship also remains constant. For level flight condition, L must equal W, the weight of the craft, and if L is increased by increasing the speed, which happens when the speed of the engine is increased, a climb will be initiated, and upon such initiation of a climb the air speed will then immediately begin to decrease.

Assuming now, that the speed of the craft is increased due to an increase in the speed of the engine or engines without changing the elevator setting to hold the nose of the craft down, such increase would exist only for an exceedingly brief instant, because the craft would immediately tend to climb by virtue of the relation between the lift and the air speed set forth in the foregoing equation, whereupon the air speed would immediately decrease (it being a positive and known fact that the speed of a plane decreases the instant it begins to climb from level flight under normal cruising speeds). It will therefore be apparent that even if the speed of the craft is momentarily increased by virtue of an increased engine speed, the speed of the craft is immediately decreased by its tendency to initiate a climb, thereby producing a decrease in pressure at the velocity tube 21 and causing a contraction of diaphragm member 20, thus producing a decreased pressure in casing 17, whereupon the pressure in the casing 6 is decreased by virtue of the connection of the latter with casing 17 through the conduit 18. Such decrease in pressure in the casing 6 causes the diaphragm member 5 to expand, which actuates the pointer 11 and gives an immediate indication of the tendency of the craft to climb upon a momentary increase in air speed due to an increased engine speed.

If the aircraft is simply cruising at a constant level and the air speed is kept constant by a constant engine speed, then if the plane begins to descend, the air speed thereof obviously increases, probably without any substantial change of engine speed, thereby producing an increased pressure in the casing 17 due to the expansion of the diaphragm member 20, which is then transmitted to the interior of casing 6 and causes a compression or contraction of the diaphragm member 5 and then gives an indication of descent on the dial 10 at the instant that the descent is initiated without necessitating a time interval to elapse and without requiring a great difference in flight levels before the rate of climb instrument becomes responsive. In the event of a climb, the reverse action takes place, namely, the air speed is decreased, thus producing a decreased pressure in casing 17, which causes the pressure in casing 6 to decrease through the conduit 18, thereby producing an expansion of the pressure sensitive element 5 and actuating pointer 11 to give an indication of climb on the dial or scale 10 before any appreciable difference in flight level has been attained. Although the rate of climb instrument may not indicate with substantial exactness under certain conditions as, for example, when the engine speed is purposely increased by the pilot and the elevator setting changed at the same time to nose the craft downward to prevent an inherent climb due to the increased engine speed, or when the pilot wilfully and knowingly goes into a dive, nevertheless, the indications at such times are immaterial to the purpose and objects of the invention because the pilot knows the altitude of his craft.

While an arrangement similar to that illustrated in Fig. 2 may be used, it has been found convenient to employ a conventional air speed indicator commonly used on aircraft and connected to the rate of climb instrument in such a manner that the casing of the air speed indicator becomes the casing 17 shown in Fig. 2 and the pressure responsive element constitutes the pressure responsive element 20.

Referring now more particularly to Fig. 4, there is illustrated one form of a practical embodiment of the invention, showing an adaption of the features illustrated in Figs. 1 and 2, the casing 6 comprising the casing of a conventional type of rate of climb instrument, and the casing 17 constituting the casing of an air speed indicator. The casing 6 has an opening 22 through which atmospheric pressure may be communicated by means of the conduits 14 and 18, as in Fig. 2, and it is elsewhere sealed from communication with the atmosphere. The pressure sensitive element or diaphragm 5 is mounted upon a bracket 23 and the interior thereof is connected to the interior of the casing 6 through an auxiliary conduit 9a and the capillary tube 7 and is also connected to the heat-insulated tank 8 through the pipe 9, as in Fig. 1. The minuteness of the passage through the capillary tube 7 affords a restricted path through which air may slowly flow when there is a pressure differential at its ends. For example, as the instrument is carried aloft and the atmospheric pressure decreases, the air confined within the diaphragm 5 (and within associated communicating enclosures) tends to flow out through the capillary tube 7 until a balance of pressure obtains. The rate of flow of air through the capillary tube is a function of the rate of change of air pressure and of the rate of change of altitude which is taking place. Differential pressure existing during such a change causes the diaphragm 5 to expand. The diaphragm 5 has pivotally connected thereto the link 13, as in Figs. 1 and 2, to which is connected a lever 13a which is pivoted at 24. The free end of the lever 13a has connected thereto one end of a flexible element, such as a chain 25, the other end of which is wound around and connected to a drum 26. The drum 26 and the pointer 11 are fixed to a staff which was shown diagrammatically in Figs. 1 and 2 as 12 and whose rotary motion is made dependent upon lever 13a by the action of a hairspring 27. Hence, as changes in atmospheric pressure are taking place, pointer 11 moves one way or the other over the dial 10 depending upon whether the change in pressure taking place is decreasing or increasing. The open end of the casing 6, at which is located the dial 10 is closed by means of a cover-glass 28, which, however, may be of any suitable transparent material other than glass, so that the dial and pointer may be visible therethrough and is secured to the casing in any suitable manner, as for example by a clamping ring 29.

In order that the rate of climb instrument be made sensitive and instantaneously responsive to altitude changes, it is connected to an air speed indicator, enclosed within the casing 17, by means of the conduit 18, in the same manner as has been illustrated diagrammatically in Fig. 2. In like manner, the expansible diaphragm 20 has imparted thereto velocity pressures by means of the velocity tube 21, whereby the volume within the casing 17 is caused to increase and decrease inversely with the changes in the velocity pressure due to changes in air speed, thereby transmitting these changes in volume to the casing 6 through a passage 30 and a coupling member 31 to which is connected the conduit 18. The interior of the casing 17 is therefore subject to atmospheric pressure as it is in constant communication with the atmosphere through coupling member 31 and static pressure tube 14 through the holes 16 and venturi 19. Hence, whenever the velocity pressure operating against the velocity tube 21 of the Pitot tube is decreased, which event starts to take place at the instant an aircraft starts to climb, the volume of the expansible diaphragm 20 will decrease in proportion with the change of velocity pressure. The interior of the casing 17, as has already been stated, is connected with the interior of the casing 6 of the rate of climb instrument through the conduit 18, and a change of air pressure in the interior of casing 17 extends to the interior of casing 6. Accordingly, an increase in the air volume of casing 17 of the air speed indicator results in reducing the air pressure within its housing. This reduction in pressure within casing 6 tends to accelerate withdrawal of air from the interior of expansible member 5 through the capillary tube 7. From this action, the movement of pointer 11 from zero position is accelerated at the instant a change in the speed of flight takes place. The static tube 14 is usually at a relatively great distance from the instrument, so that equalization of changed pressures in the two instrument casings 6 and 17 takes place through conduit 18 prior to atmospheric pressure distribution to conduit 18 through the conduit connecting the static pressure tube 14.

The air speed indicator is of a well-known construction and the operation of the indicating parts is well understood. Briefly, expansible member 20 operates upon a pin 32 carried by a rockshaft 33, and a second pin 34 carried by the rockshaft 32 contacts with an arm 35 through which a sector 36 is operated. A pinion 37, which is carried by the pointer shaft 38, meshes with sector 36, whereby a pointer 39 carried by the shaft 38 is actuated in response to movements of the associated elements deriving their motion from the expansible member 20. The pointer 39 is arranged to traverse a dial 40 having a suitable scale 41 thereon calibrated in terms of miles per hour. The open end of the casing 17 is closed by means of a cover-glass 41 which, however, may be of any suitable transparent material other than glass, and which is held firmly in place by means of a clamping ring 42.

The mode just described of employing the invention is convenient because it enables the Pitot-static tube assembly ordinarily associated with an air speed indicator to be used in conjunction with the rate of climb instrument. Furthermore, the two instruments concerned may be standardized for use on any kind of aircraft regardless of its design.

Figure 3:
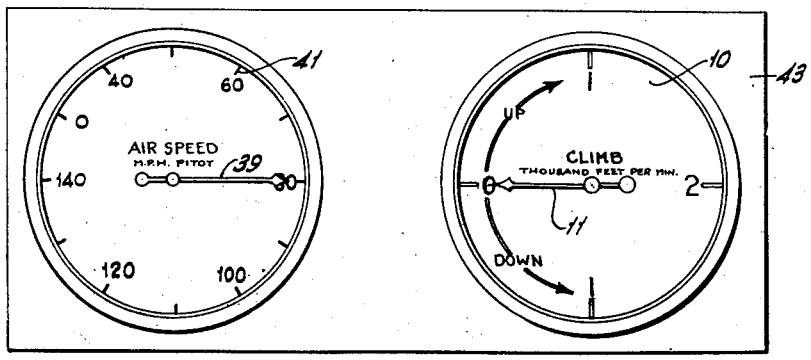
Fig. 3 is a front view of an air speed indicator and a rate of climb instrument embodying the present invention, mounted upon an instrument panel.

In Fig. 3 there is illustrated the appearance of an air speed indicator and a rate of climb instrument mounted on a panel 43 and indicating that an aircraft carrying the same is flying level at a speed of 80 miles per hour. Assuming that for a given commercial craft this speed is the cruising speed when the pointer 39 is horizontal: suddenly, a drop in speed is noted as the pointer rises and by the assistance of the present invention the pilot is immediately able to tell by reading the rate of climb instrument, whether or not the change in speed of his craft is due to a sudden increase in elevation. If the pointer 11 of the rate of climb instrument has also risen from a horizontal position, the pilot would be immediately apprised of the circumstance and could restore the craft to its original flight level and also avert exceeding the angle of climb at which his craft would stall, if such correction be necessary. Formerly, a pilot would have had to have trusted to his judgment, and his craft might have exceeded a critical angle before the fact was forecast by the rate of climb instrument.

It will be apparent to those skilled in the art that the invention is capable of wide variation and relationship of parts without departure from the nature and principle thereof and that such variation may include the reversal of the relation of the expansible diaphragms and casings so as to make the interior of the diaphragms normally subject to atmospheric pressure while the interior of the casing is made responsive to atmospheric pressure only through capillaries. Such an alternative relation for a rate of climb instrument is recognized and reference may be had to United States Patent No. 1,338,358 for additional information relative thereto.

It is not intended to restrict the invention unessentially in the foregoing or other particulars, but it is contemplated that such alterations and modifications within the scope of the appended claims may be made as may be found advisable, and reference is therefore to be had to said claims for a definition of the limits of the invention.

I claim:

1. A rate of climb indicator for aircraft comprising, in combination, a casing, an expansible diaphragm device in said casing and having a yielding wall forming two chambers with said casing, means connecting one of said chambers to a point of static pressure of the atmosphere through which the aircraft is traveling, means providing a restricted connection from the other chamber to the atmosphere through said connecting means, a container connected to said other chamber for increasing the effective volume of the latter, a second casing having an expansible diaphragm device therein operated by velocity pressures, means connecting said second casing to the first casing whereby movement of the yielding wall of the first-mentioned diaphragm device is affected by velocity pressures, and indicating means controlled by said yielding wall.

2. In an instrument adapted to be mounted on an aircraft, the combination of a casing, a pressure responsive member in said casing and having a yielding wall forming two chambers with the casing, means for subjecting one side of the yielding wall to prevailing static pressures of the atmosphere through which the aircraft is traveling, means providing a restricted passage of air between the two chambers for retarding the rate at which the pressure on the other side of said wall tends to become equal to the atmospheric pressure thereby producing movement of the yielding wall, means responsive to changes in velocity pressure due to changes of speed of the aircraft for effecting the movement of said yielding wall, and indicating means actuated by said wall as the latter moves in response to differential pressure corresponding to the rate of change of altitude and changes in velocity pressures.

3. In apparatus adapted to be mounted on an aircraft, the combination of a casing, means connecting said casing to a point of static pressure of the atmosphere through which the aircraft is traveling, a pressure responsive element in said casing, means providing a restricted connection between said element and said casing and subjecting said element to movements depending upon the rate of change of pressures thereon, means for influencing the movement of said element in accordance with the velocity pressure produced by the movement of said vehicle and indicating means actuated by said element.

4. In apparatus adapted to be mounted on an aircraft, the combination of a casing, a pressure responsive element in said casing, means providing a restricted passage between the interior of said element and the casing and subjecting said element to movements depending upon the rate of change of pressures thereon, a second casing in communication with said first casing and also having a pressure responsive element therein, a Pitot device having a static pressure tube and a velocity pressure tube, means connecting the two casings to the static tube, means connecting the pressure element of the second casing to the velocity tube, and indicating means for and controlled by each of said pressure responsive elements.

5. In an instrument adapted to be mounted on an aircraft, a casing, an expansible pressure responsive device in said casing, means for subjecting the outside of said device to static pressure of the atmosphere through which the aircraft is traveling, means for varying the pressure on said side in accordance with changes in velocity pressure due to changes in speed of the aircraft, means providing a restricted passage of air between said pressure device and said casing for retarding the rate at which the pressure on the inside of said device tends to become equal to a changing static pressure, and indicating means associated with said pressure device for indicating the movements of the latter.

6. In an instrument adapted to be mounted on an aircraft, a casing, an expansible diaphragm device in said casing and having a yielding wall which forms two chambers with said casing, means providing a restricted passage of air between the two chambers for retarding the rate at which the pressure on one side of said wall tends to become equal to changing static atmospheric pressure, a second casing having an expansible diaphragm device therein, a Pitot device having a velocity pressure tube and a static pressure tube exposed to the atmosphere through which the aircraft is traveling, means connecting the velocity pressure tube to the second expansible diaphragm device, means connecting the two casings with each other and with the atmosphere through said static pressure tube, the connection to the atmosphere having a relatively restricted passage for offering greater resistance to the flow of air therethrough than the resistance to the flow of air between the two casings, and indicating means operated by the yielding wall.

7. In an instrument adapted to be mounted on an aircraft, a casing, an expansible diaphragm device in said casing and having a yielding wall forming two chambers with said casing, means connected to one of said chambers for subjecting one side of the wall to static pressure of the atmosphere through which the aircraft is traveling, means providing a restricted passage between the two chambers for retarding the rate at which the pressure on the other side of the wall tends to become equal to a changing static pressure due to changes in altitude of the aircraft, a second casing containing an expansible diaphragm device, means connected to said second diaphragm device for varying the pressure in the second casing in accordance with changes in velocity pressure due to changes in speed of the aircraft, means connecting the two casings with each other and to the static pressure of the atmosphere, and indicating means operated by the yielding wall of the first expansible diaphragm device.

8. In an instrument adapted to be mounted on an aircraft, the combination of a casing, an expansible diaphragm device in said casing, means providing a restricted connection between the casing and the diaphragm device, a second casing containing an expansible diaphragm device, a velocity pressure Pitot tube connected to said second expansible diaphragm device, means connecting the two casings with each other and to a point of static pressure of the atmosphere through which the aircraft is traveling, and indicating means operated by the first diaphragm device.

9. In a rate of climb indicator adapted to be carried by an aircraft and including a casing, indicating means, an expansible diaphragm device in said casing and having a yielding wall for actuating said indicating means, means connecting said casing and expansible diaphragm device in restricted communication with each other, and means connecting the casing to a point of static pressure of the atmosphere through which the aircraft is traveling, the combination with said rate of climb indicator of means for modifying the pressure within the casing and exteriorly of the diaphragm device in accordance with changes in velocity of the aircraft.

10. In a rate of climb indicator adapted to be carried by an aircraft and including a casing, indicating means, an expansible diaphragm device in said casing and having a yielding wall for actuating said indicating means, means providing a restricted passage between the diaphragm device and the casing, and means connecting the interior of the casing to a point of static pressure of the atmosphere through which the aircraft is traveling, the combination wtih said rate of climb indicator of means for affecting the indications of the latter in accordance with changes in velocity of the aircraft, said means comprising a second casing connected to the first casing and containing an expansible diaphragm device, a Pitot device having static and velocity pressure tubes, means connecting the velocity tube to the second diaphragm device, and means connecting the static tube to the common connection of the two casings.

11. In a rate of climb indicator adapted to be carried by an aircraft and including a casing, indicating means, an expansible diaphragm device in said casing and having a yielding wall for actuating said indicating means, means providing a restricted passage between the diaphragm device and the casing, and means connecting the casing to a point of static pressure of the atmosphere through which the aircraft is traveling, the combination with said rate of climb indicator of an air-speed indicator connected thereto and operable under a differential pressure resulting from a velocity head and a static head for affecting the indications of the rate of climb indicator in accordance with changes in velocity of the aircraft.

12. In a rate of climb indicator adapted to be carried by an aircraft, a casing, an expansible diaphragm device in said casing and having a yielding wall forming two chambers with said casing, means connecting one of said chambers to a point of static pressure of the atmosphere for subjecting one side of the yielding wall to said static pressure, means providing a restricted connection between the two chambers for retarding the rate at which the pressure on the other side of the wall tends to become equal to changing static pressure, means responsive to changes in velocity pressure due to changes in speed of the aircraft for effecting changes in volume of one of said chambers, and indicating means actuated by the yielding wall in accordance with the rate of change of differential pressure operative on said wall.

13. In combination, a rate of climb indicator including a casing having a connection to a point of static pressure of the atmosphere through which the aircraft is traveling, an expansible diaphragm device in said casing and having a restricted communication therewith, indicating means operated by said diaphragm device, and means for instantaneously influencing the indications of said rate of climb indicator upon initiation of a change in velocity of the aircraft, said last-named means comprising an air-speed indicator operable under a differential pressure resulting from a velocity head and a static head, and means connecting the two indicators for subjecting the rate of climb indicator to the changes in pressure corresponding to changes in velocity of the aircraft.

14. In combination, a rate of climb indicator, an air-speed indicator, each of said instruments having a casing, and means connecting the two casings together so that pressure from one may be transmitted to the other whereby an indication in the air-speed indicator is effective to produce an immediate indication on the rate of climb indicator before an appreciable change in altitude has taken place.

15. In combination, a rate of climb indicator for aircraft, and means controlled by the velocity of the aircraft for influencing the rate of climb indicator.

16. In a rate of climb indicator for aircraft, a casing having an auxiliary chamber therein provided with three openings, an expansible diaphragm device mounted in said casing and having its interior connected to said auxiliary chamber through one of said openings, a capillary tube mounted in another of said openings and projecting into the casing for providing a restricted continuously open passage between the interior of the diaphragm device and the interior of the casing through said auxiliary chamber, a container exterior of the casing and connected to the auxiliary chamber through the third opening and having a larger volume than the diaphragm device for increasing the sensitivity of the latter, means including a static tube connecting the interior of the casing to a point of static pressure of the atmosphere through which the aircraft is traveling whereby a difference of pressure is created between the interior and exterior of the diaphragm device upon a change in altitude of the aircraft, which pressure tends to become equalized through the capillary tube, and indicating means connected to and operated by the diaphragm device.

17. In a rate of climb indicator for aircraft, a casing having an auxiliary chamber therein provided with three openings, an expansible diaphragm device mounted in said casing and having its interior connected to said auxiliary chamber through one of said openings, a capillary tube mounted in another of said openings and projecting into the casing for providing a restricted continuously open passage between the interior of the diaphragm device and the interior of the casing through said auxiliary chamber, a container exterior of the casing and connected to the auxiliary chamber through the third opening and having a larger volume than the diaphragm device for increasing the sensitivity of the latter, said casing also having an opening for subjecting the interior thereof to atmospheric pressure whereby a difference of pressure is produced between the interior and exterior of the diaphragm device upon a change in altitude of the aircraft, which pressure tends to equalize through the capillary tube, and indicating means connected to and operated by the diaphragm device.

CHARLES H. COLVIN.